Oct. 3, 1950 G. S. KNOX 2,524,264
REGULATOR VALVE
Filed April 28, 1947 6 Sheets-Sheet 1
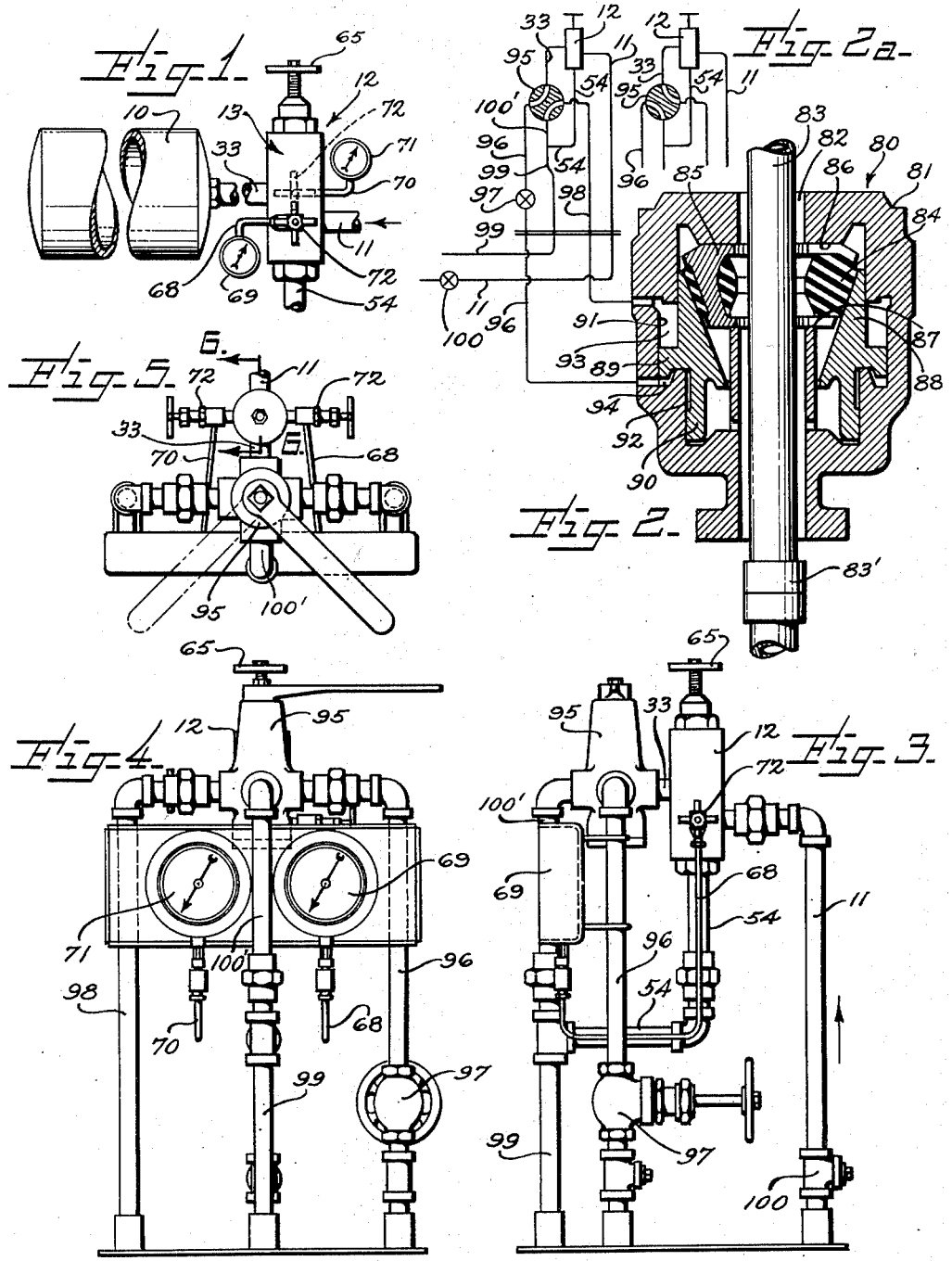
Inventor
Granville S. Knox,
Barkelew & Scantlebury
Attys.

Oct. 3, 1950     G. S. KNOX     2,524,264
REGULATOR VALVE
Filed April 28, 1947     6 Sheets-Sheet 2
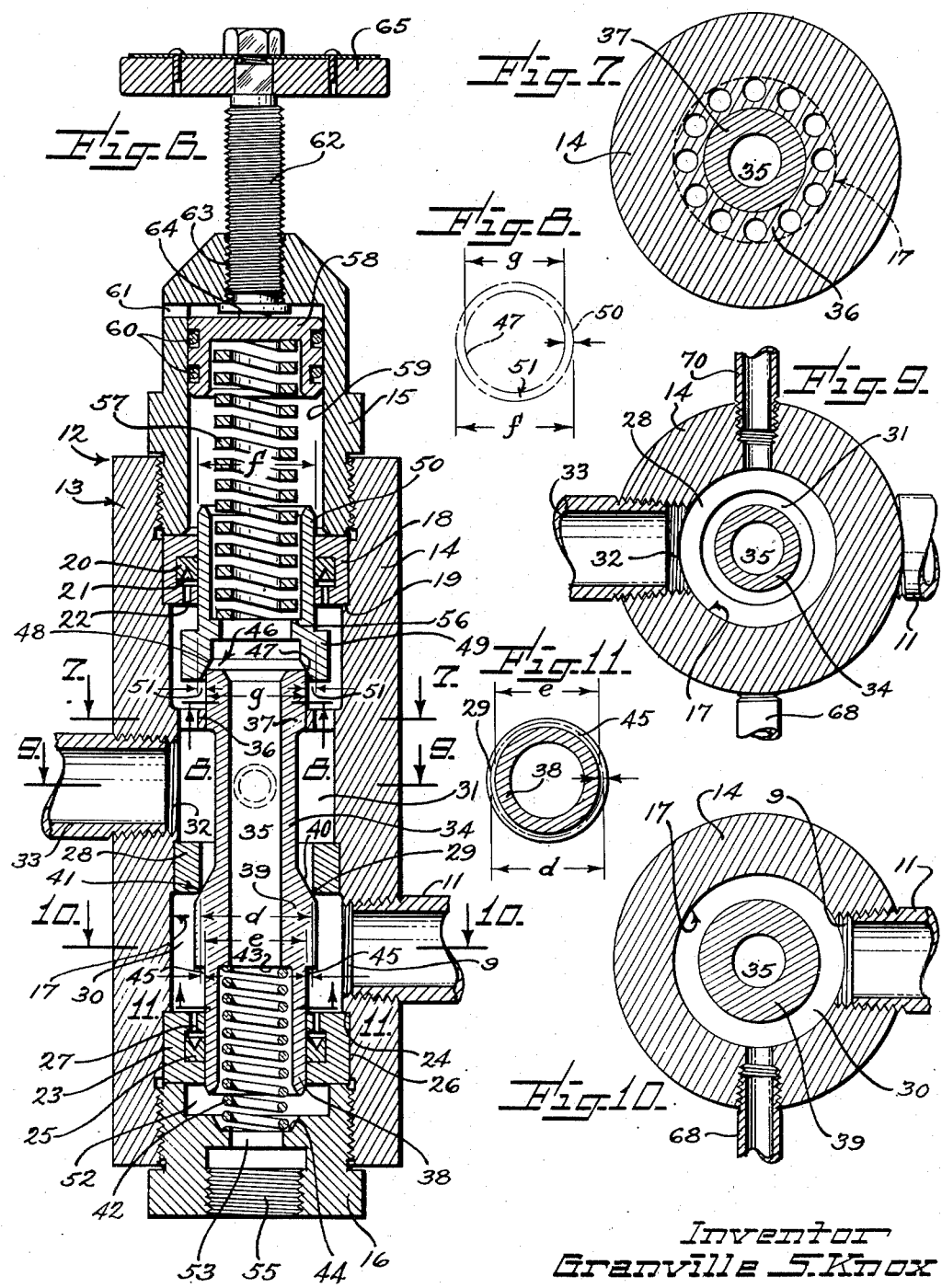
Inventor
Granville S. Knox
Barbelou & Scanlbebury
Attys.

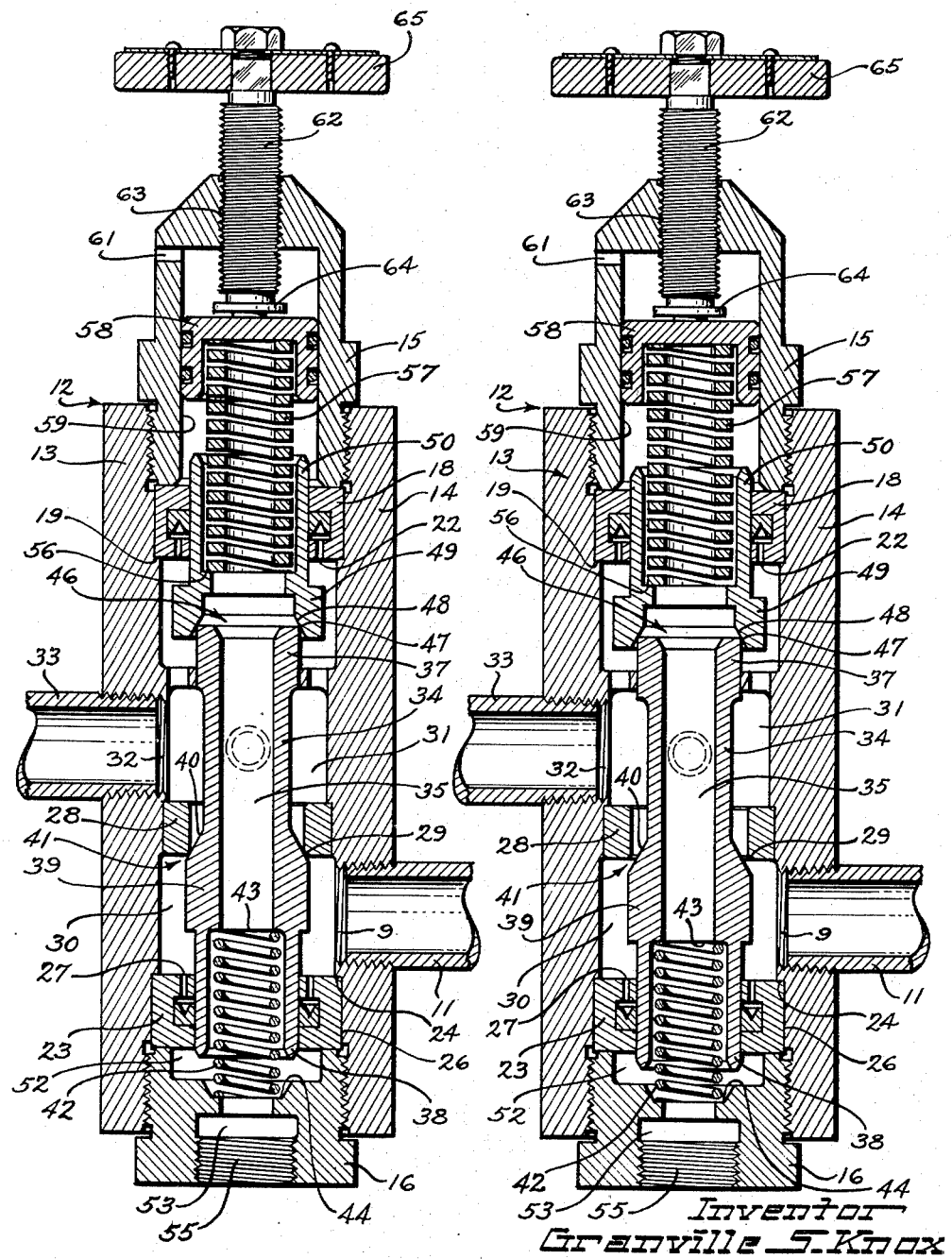

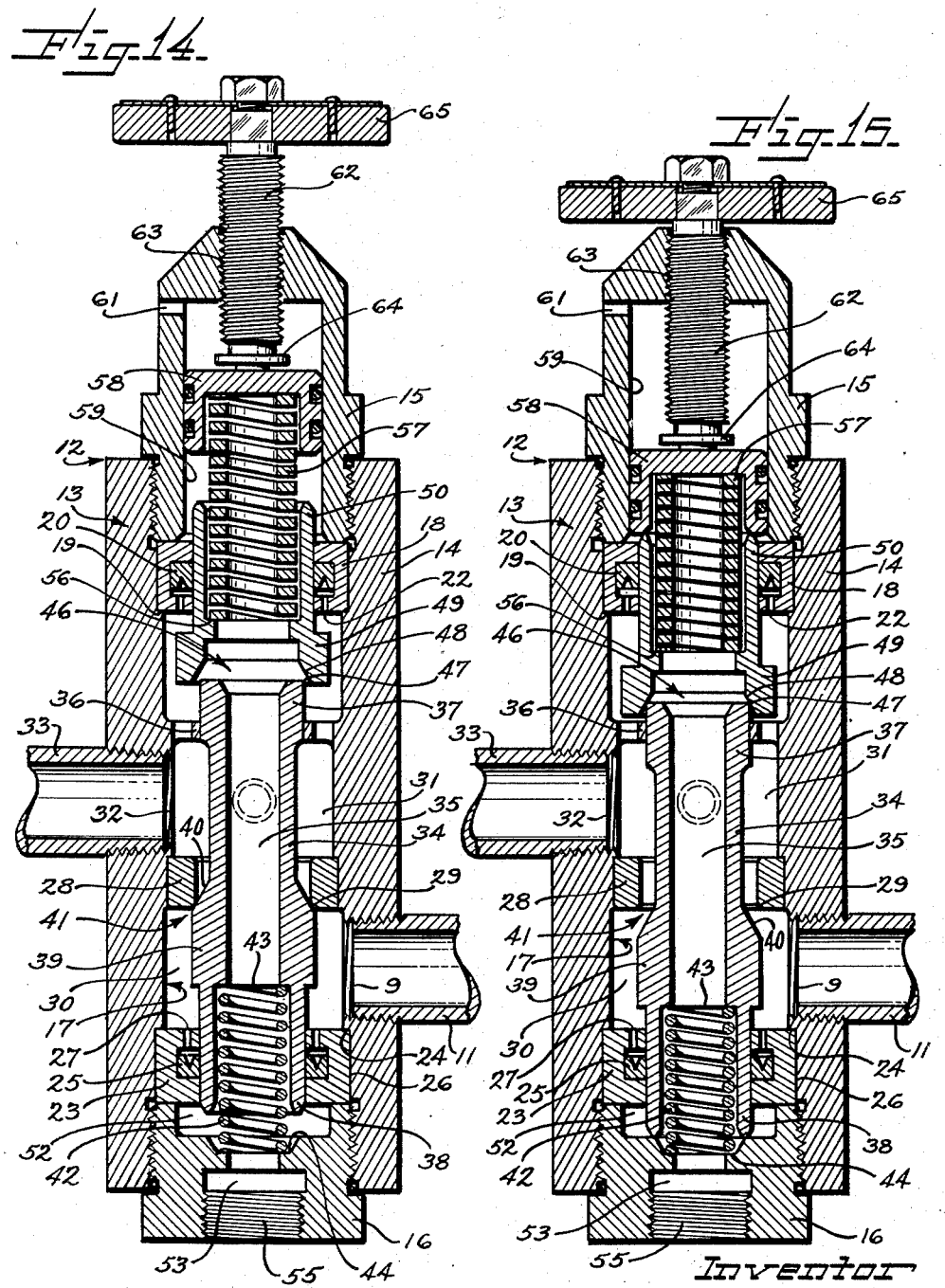

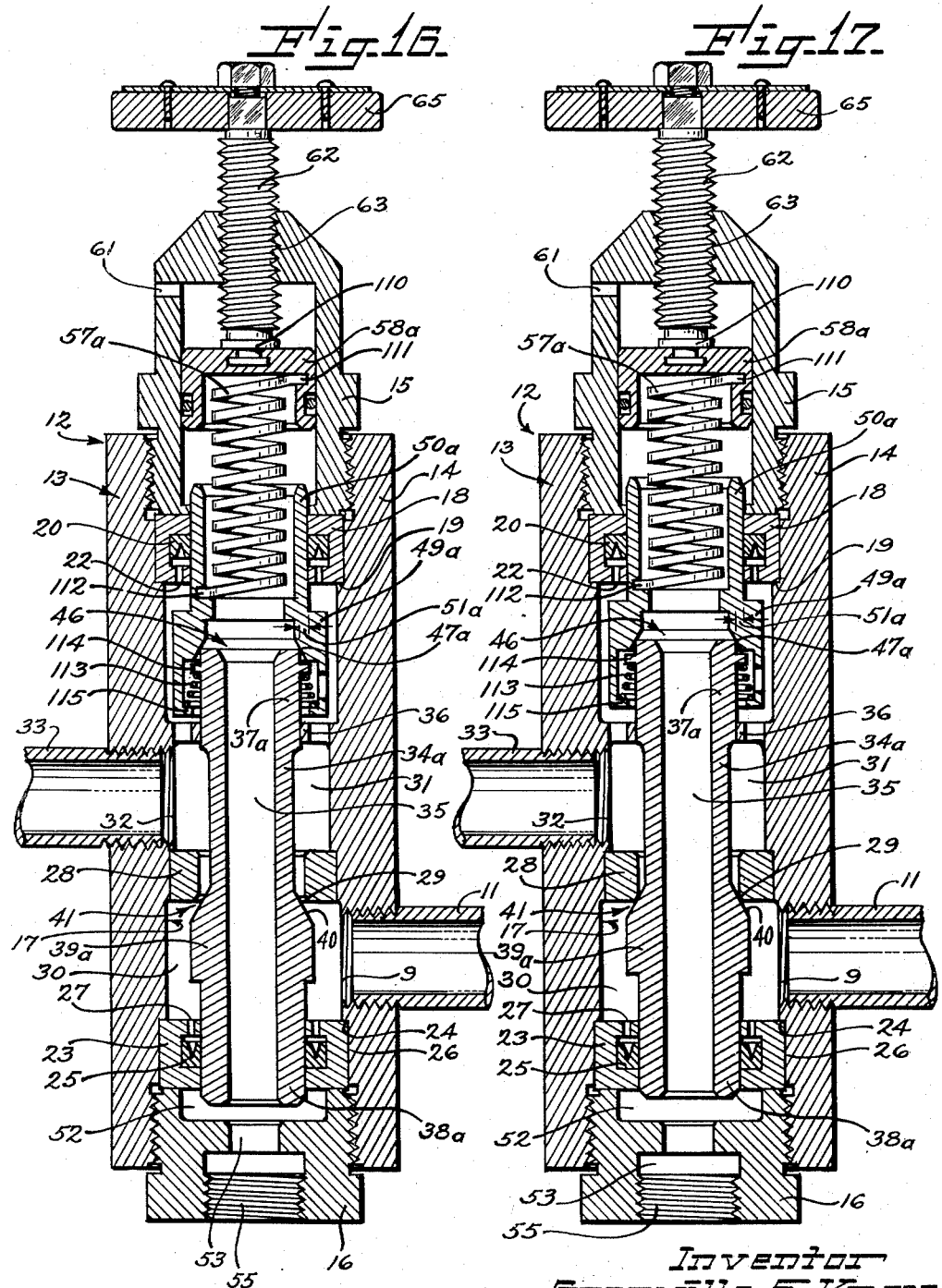

Oct. 3, 1950 G. S. KNOX 2,524,264
REGULATOR VALVE
Filed April 28, 1947 6 Sheets-Sheet 6
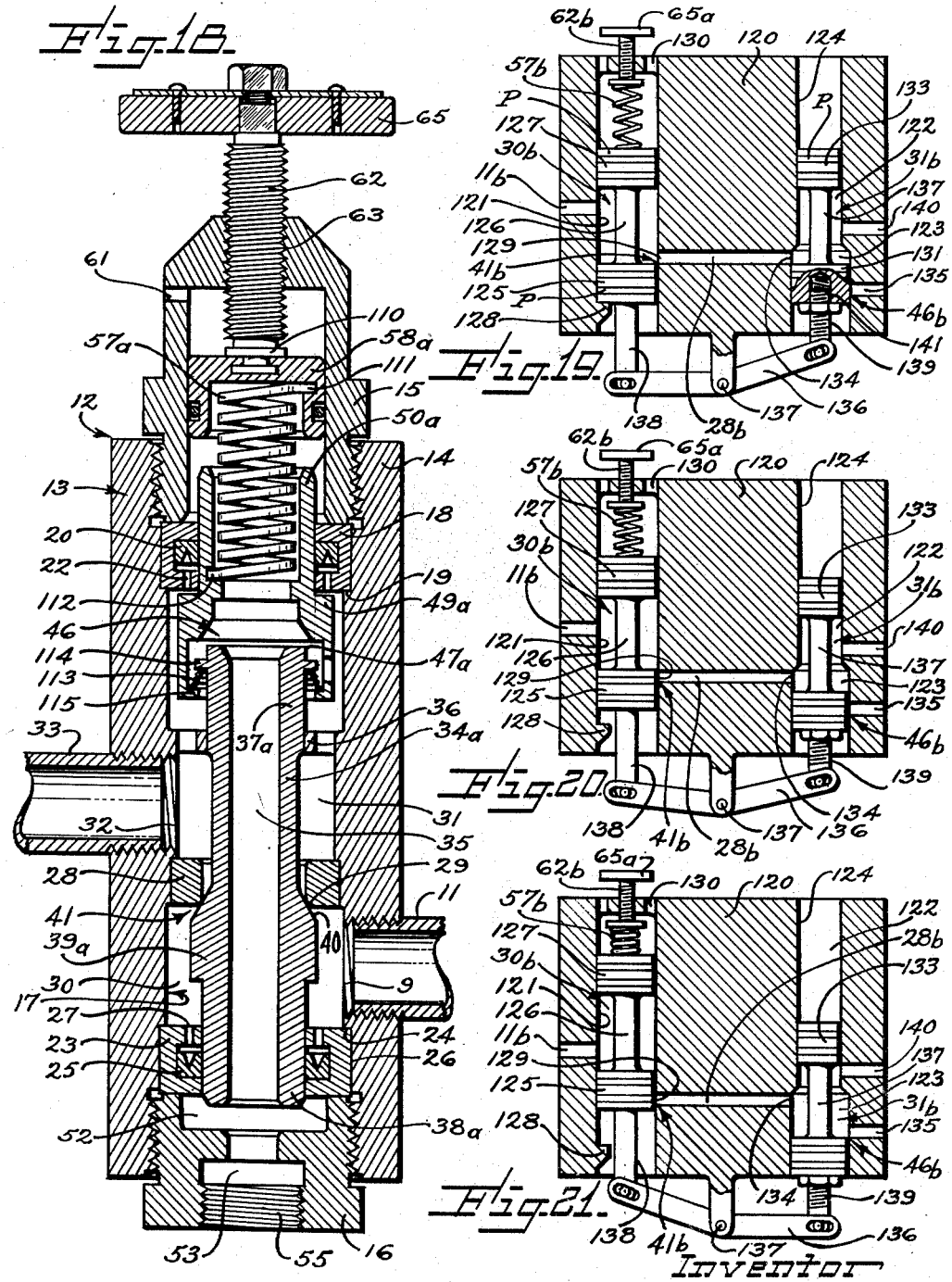
Inventor
Granville S. Knox
Barbeau & Scantlebury
Attys Patented Oct. 3, 1950

2,524,264

UNITED STATES PATENT OFFICE 2,524,264

REGULATOR VALVE

Granville S. Knox, Los Angeles, Calif., assignor to Hydril Corporation, Los Angeles, Calif., a corporation of California Application April 28, 1947, Serial No. 744,353

7 Claims. (Cl. 50—35)

This invention has to do generally with valves and is more particularly concerned with pressure regulating valves whereby, irrespective of the pressure of the fluid admitted to the valve, the value of the delivered pressure is regulatable, within limits, to maintain selected pressures within the receiver to which the fluid is delivered.

One of the principal objects of the invention is to provide a valve wherein adjustment of the device to build up a predetermined pressure within a receiver, automatically adjusts the device as to the pressure at which the receiver will be relieved or bled-off. That is, if the device is set to build up pressure of a predetermined value in a receiver, it is automatically set to bleed off if and when a slightly higher pressure is created in the receiver, which rise in pressure may occur by reason of leakage past the inlet valve or by reason of a rise in the temperature of the fluid within the receiver. Then, if the inlet valve be regulated to deliver a greater or lesser pressure, the bleed valve automatically responds at a corresponding higher or lower pressure, thus preserving a given differential between inlet pressure and bleed-off pressure no matter what may be the setting for the inlet pressure. Preferably, the valve is made adjustable so the predetermined differential may be varied, for in some cases it is desirable that the receiver bleed almost the instant the delivery pressure is exceeded, and in other cases it is permissible and desirable that the receiver-pressure build up considerably before it need be bled off.

The advantages of this arrangement are obvious, for the operator need make but one adjustment—that of setting the valve to deliver predetermined pressure—and he is assured that, in effect, the bleed valve has been automatically re-set to insure a bleed-off at some selected higher pressure.

It is thus possible to maintain in the receiver a pressure between given limits irrespective of the conditions tending to lower or raise that pressure.

While the valve is capable of use in any installation where the above type of performance is advantageous, it is particularly useful in connection with blow-out preventers or control heads used in connection with the drilling of oil wells, and I have therefore shown an embodiment of the invention in that environment, without, however, intending in any way to imply a limitation of the adaptability of the valve. I have chosen for illustrative purposes a blow-out preventer and control head of the type disclosed in my copending application entitled "Control Head and Blow-out Preventer," filed August 16, 1946, Serial Number 691,110. The embodiment of the valve illustrated in Figs. 1 to 15 is especially well adapted to this particular use, since it is adapted to handle relatively high pressures and is not susceptible of failure by reason of foreign matter in the operating fluid.

In such an installation it is essential that there be provision for quickly applying full pressure to the pack-off member to close the latter tightly around the pipe in the event of a sudden rise in well pressure, but then, in order to allow continued rotation of the drill stem, the applying pressure must be reduced to and held at some certain value, depending upon individual well conditions, which pressure is ample to hold the well pressure and yet not cause the packer to be harmed during pipe movement. My regulating valve permits the operator to cope completely with this problem. Then, should a leaky inlet valve cause the pressure in the packer-applying chamber to build up to a given limit, the bleed valve automatically bleeds off excess pressure.

Furthermore, it is often necessary to move the drill pipe vertically through the packer after the latter has been set. The regulating valve not only permits the establishment of a packer-setting pressure which will allow for such pipe-movement, but it automatically cares for the particular conditions which arise as the couplings on the drill pipe are "stripped" through the packer during vertical movement of the pipe. As these couplings pass through the packer, the packer-actuating member is moved in a manner tending materially to increase the pressure of the actuating fluid. The bleed-valve, under these conditions, allows the displacement of some of the actuating fluid so the pressure is not raised beyond a predetermined limit. Then, after the coupling has passed through the packer, the inlet valve immediately admits additional fluid to the actuating chamber to compensate for the fluid displaced through the bleed valve, thus restoring the pressure to the predetermined value.

Other features and objects of the invention will be apparent from the following detailed description, reference being made to the accompanying drawings, wherein Fig. 1 is an elevation showing my valve in association with a conventionally illustrated receiver, Fig. 2 is a schematic view showing the association of the valve with a control head or blow-out preventer, Fig. 2a shows one of the valves of Fig. 2 in changed condition, Fig. 3 is an elevation of the valve in association with the manifolding system conventionally shown in Fig. 2, Fig. 4 is a side elevation of Fig. 3, Fig. 5 is a top plan view of Fig. 4, Fig. 6 is an enlarged vertical section on line 6—6 of Fig. 5, Fig. 7 is a section on line 7—7 of Fig. 6, Fig. 8 is a schematic view showing, in greatly exaggerated scale, an effective pressure area, as considered from the aspect of line 8—8 of Fig. 6, which area plays a part in the operation of the valve, Fig. 9 is a section on line 9—9 of Fig. 6, Fig. 10 is a section on line 10—10 of Fig. 6, Fig. 11 is a section on line 11—11 of Fig. 6, showing, in greatly exaggerated scale, an effective pressure area which plays a part in the operation of one embodiment of the invention, Fig. 12 is a view similar to Fig. 6, but showing the valve members adjusted to different positions and with the inlet valve open, Fig. 13 is a view similar to Fig. 12, but showing the inlet valve closed, Fig. 14 is a view similar to Fig. 13 but showing the bleed valve open, Fig. 15 is a view showing the regulator valve adjusted to one of its extreme positions, exactly opposite that of Fig. 6, Fig. 16 is a sectional view of a variational embodiment of the invention, showing the inlet valve open, Fig. 17 is a view similar to Fig. 16 but showing the inlet valve closed, Fig. 18 is a view similar to Fig. 17, but showing the bleed valve open, Fig. 19 is a sectional view of another variational embodiment of the invention, showing the inlet valve open, Fig. 20 is a view similar to Fig. 19 but showing the inlet valve closed; and Fig. 21 is a view similar to Fig. 20 but showing the bleed valve open.

In Fig. 1 I have conventionally indicated at 10, a tank which is to be broadly considered as a "receiver" adapted to receive fluid under pressure from a line or pipe 11 and through my improved regulator valve, generally indicated at 12. It is the office of valve 12 to regulatably maintain, within certain limits, any selected fluid pressure within the receiver.

Fig. 6 shows valve 12 as adjusted to one of its extreme positions, in which position the inlet valve is closed and will not automatically open no matter how low the pressure in the receiver may drop. But the bleed valve is in a condition to bleed the receiver should the receiver-pressure rise above a certain limit due, for instance, to an increase in the temperature of the receiver-fluid or due to leakage past the inlet valve. Therefore, this figure, while it does not show the valve in a condition to perform all its offices, serves as a proper starting basis for description.

In order to clarify certain relationships, it will be helpful to consider the drawings as representing a valve adapted to suit certain working conditions and to handle certain pressures. For this reason, I will ascribe dimensions to certain elements and will ascribe certain effective strengths to the springs. However, it is to be distinctly understood that this is done merely for illustrative purposes, and the ascribed dimensional and strength characteristics are in no way to be considered as limitative.

The housing 13 is made up of a sleeve 14, and top and bottom members 15 and 16, respectively, threaded into the bore 17 of the sleeve. To give an idea of the approximate size of the elements of a typical valve adapted to the control of pressures up to 2000 lbs. per square inch or more, the scale of Fig. 6 may be considered as such that sleeve 14 is about 9" long and about 3⅝" outside diameter, with all other elements of corresponding relatives sizes.

Cap member 15 holds the packing-retainer ring 18 tightly against housing shoulder 19, this retainer carrying a "chevron" type packing ring 20, whose annular recess 21 is exposed, through ports 22, to fluid pressure below the retainer. Bottom member 16 holds the packing-retainer ring 23 tightly against housing shoulder 24, the retainer carrying a "chevron" type packing ring 25, whose annular recess is exposed, through ports 27, to fluid pressure above the retainer.

Intermediate the retainers 18 and 23 is the press-fitted ring 28 which provides an inlet valve seat 29 dividing bore 17 into primary chamber 30 and secondary chamber 31. Inlet or line pressure, as supplied from a pump (not shown) or an accumulator (not shown) is admitted from pipe 11 through inlet port 9 to primary chamber 30, while outlet port 32 of chamber 31 is connected by pipe 33 to receiver 10.

Vertically slidable through the housing bore is a tubular stem 34 whose bore is indicated at 35. The stem is guided for axial movement by apertured flange 36 (Fig. 7) which takes the stem-head 37, and the lower packer retainer 23 which takes the lower extension 38 of the stem. The stem carries an intermediate enlargement or inlet valve stopper 39 whose conical face 40 is adapted to sealingly engage seat 29 for closing the inlet valve generally indicated at 41.

In the condition of Fig. 6, a compression spring 42, interposed between stem shoulder 43 and housing shoulder 44, is adapted yieldingly to hold inlet valve 41 closed. Preferably, though not necessarily, I have provided differential pressure areas whereby, when the inlet valve is closed and pressure stands in chamber 30, the fluid pressure in that chamber is effective to more tightly and surely seat the inlet valve. Thus, the diameter $d$ of seat 29 (Figs. 6 and 11) is greater than the diameter $e$ of stem extension 38, thus providing an annular effective pressure area 45 against which the pressure in chamber 30 acts to press face 40 more tightly against seat 29 after the inlet valve has been spring-closed. The extent of this area is greatly exaggerated in the drawings for, in a valve of the size indicated by the specified scale, this area is only of the order of .01 square inch.

The upper enlargement or head 37 of stem 34 provides one element of the bleed-valve generally indicated at 46, the upper and outer circumferential edge 47 of the head being adapted to seat on the conical face 48 of bleed valve element 49. Element 49 is in the form of a sleeve having an upward tubular extension 50 which is guided for axial movement by packing 20. The diameter $f$ of extension 50 is larger than the diameter $g$ of seat 47, there resulting an annular effective pressure area 51 (Fig. 8) exposed to fluid pressure in secondary chamber 31 whereby such pressure tends to elevate valve element 49 against the force of spring 57, and, when the inlet valve 41 is closed, tends to open bleed valve 46 by lifting element 49 and face 48 clear of stem-edge 47. When the bleed valve is thus opened, fluid within the secondary chamber 31 passes downwardly through bore or duct 35 to the bleed chamber 52 below packing 25 and thence passes directly to the atmosphere through bottom port 53 or to a waste pipe 54 (Fig. 1) threaded into housing member 16 at 55.

The extent of effective pressure area 51 is greatly exaggerated in the drawings, for, in a valve of the size indicated by the specified scale, this area is only of the order of .4 square inch.

Seated on shoulder 56 of element 49 is a compression spring 57 which is capped by depresser 58, the latter being slidable through the bore 59 of housing cap 15 and being packed off at 60. The upper end of bore 59 is vented at 61.

An actuating or regulating screw 62 is threaded through cap 15 at 63 and has an extension 64 adapted to bear on the upper end of depresser 58, so, by rotating hand wheel 65 right handedly, member 58 compresses spring 57, or, if member 58 is already depressed, left-hand rotation of wheel 65 allows the spring to extend.

It will first be assumed that the regulator valve is in the condition of Fig. 6 and that spring 57 is unstressed, though under conditions where it is desired to get the valve initially into full operating condition with fewer turns of the hand wheel, the upper spring may be pre-stressed, within limits, when screw 62 is in the position of Fig. 6. On the other hand, spring 42 is stressed to an extent which assures that the inlet valve 41 is closed when the parts are in the positions of Fig. 6, whether or not spring 57 is pre-stressed.

It will also be assumed that there is fluid pressure standing in the primary chamber 30, which pressure, acting against effective area 45, aids in holding the inlet valve closed. The weight of element 49 then insures that the bleed valve is closed, the bodily imposition of the unstressed spring 57 assuring that the element 49 may not be accidentally moved clear of head 37.

The lower spring is considerably lighter than is the upper spring, in fact, in the illustrated embodiment it has, when unstressed, only about one eighth the resistance to compression had by the unstressed upper spring, though this particular ratio is not at all controlling. For example, if the upper spring be compressed through an increment which increases its expansive force by 20 pounds, a like extent of compression of the lower spring increases its expansive force only about 2.5 pounds.

It will be assumed that, in the condition of Fig. 6, spring 42 is pre-stressed to exert an upward force of 30 lbs. To this force, tending to keep valve 41 closed, is added the force represented by P (.01 sq. in.) where P equals the inlet pressure standing in chamber 30 and .01 sq. in. equals the area of effective pressure taking face 45.

Obviously, no fluid can pass through the inlet valve to the secondary chamber 31, except for leakage. However, if there be such leakage or if there be an expansion of fluid in the receiver due to a temperature rise, as soon as the "back-pressure" (the pressure built up in the secondary chamber 31) reaches a value such that, applied against pressure area 51, the element 49 is raised against the resistance of spring 57, the bleed valve 46 opens, for element 37 cannot follow element 49 upwardly due to the engagement of stopper 39 with seat 29. Thus the separation of elements 49 and 37 permits the excess pressure to be bled off through duct 35 and port 53. As soon as the back pressure is relieved, spring 57 acts to re-close the bleed valve.

To set the regulating valve so it will regulate the inlet pressure, as well as allow relief bleeding, it is first necessary to turn down screw 62 until spring 57 is stressed sufficiently to offset the combined up-force exerted by spring 42 and by the inlet pressure to the extent the latter is effective on pressure area 45. Thereafter, a further depression of the member 58 opens inlet valve 41 against the specified up-force and, of course, the instant the valve is open, the inlet fluid pressure no longer exerts an up-force on the valve stem.

Preferably, pipe 68 leads from primary chamber 30 to gage 69, and pipe 70 leads from secondary chamber 31 to gage 71 (Fig. 1) thus making it possible for the operator to ascertain the pressures in these two chambers at all times. Usual shut-off valves 72 are provided in gage lines 68 and 70.

Let us assume that member 58 has been depressed to the extent indicated in Fig. 12, this being well beyond the point where the upper spring is capable of overpowering the lower spring. The upper spring now exerts a downward force of given value, which value depends upon the extent to which the spring has been compressed by turning down screw 62. Inlet valve 41 has been opened by the downward force of spring 57, acting through element 49 and stem 34. The fluid in pipe 11 and inlet chamber 30 flows through open valve 41 into the secondary chamber 31 and thence flows through outlet 32 and pipe 33 to receiver 10, building up the pressure in the receiver and in chamber 31. This built-up pressure is applied against the effective pressure taking area 51, tending to raise element 49 against the down-force of spring 57. When the force represented by the built-up pressure multiplied by the value of area 51, is sufficient to overpower the down-force of spring 57, the element 49 rises (further compressing spring 57) and the lower spring 42 causes stem 34 to follow element 49. In fact, the lower spring contributes its approximately 30 pounds of up-force to the overpowering of the upper spring. Bleed valve 46 is thus maintained in a closed condition as element 49 rises and, finally, valve plug 39 engages seat 29 to close inlet valve 41 and thus to prevent the building up of further pressure in the secondary chamber 31 and receiver 10. This is the condition represented in Fig. 13 and the pressure as established in receiver 10 and chamber 31 at the time the inlet valve is thus closed, will be considered as the "regulated" pressure.

Were the regulating screw now to be turned down sufficiently to cause further compression of spring 57 in an amount capable of again overpowering spring 41 and additionally compensating for the inlet pressure as applied against area 45, valve 41 would again be opened and the pressure within the receiver and the secondary chamber would build up correspondingly until the built-up pressure is sufficiently high to overpower the additional downward force of the additionally compressed upper spring, whereupon the inlet valve will again close, but the built-up or "regulated" pressure in the receiver and secondary chamber will have been correspondingly increased. Thus it is possible, at will, to regulate the built up pressure by adjustment of hand wheel 65.

It will be noted that, due to the fact that the inlet pressure is effective against pressure area 45 only when the inlet valve is closed, in setting the regulator for a higher built-up pressure, a slight rotation of hand wheel 65 is necessary before the inlet valve gives opening response. When the area 45 is omitted, the inlet valve responds instantly upon downward adjustment of follower 58.

If the regulator be in the condition of Fig. 13 and the pressure in receiver 10 and chamber 31 drops below the "regulated" value, the upward force imposed on pressure area 51 is correspondingly reduced, and spring 57 becomes effective to reopen valve 41 (Fig. 12) which stays open until the regulated pressure, for the given setting of screw 62, is restored.

Now assume the device is in the condition of Fig. 13 and there is an increase in the pressure within the receiver and chamber 31. Such an increase may be caused by leakage past the inlet valve 41, or by a rise in the temperature of the receiver fluid, or by movement of a displacement member in the receiver (as will be described in connection with an installation such as that represented in Fig. 2).

This increased pressure is to be bled off by the opening of valve 46, that is, while stem 34 remains in the position of Fig. 13, element 49 is to be raised to the position of Fig. 14. Such actuation of element 49 is caused only when the built-up pressure is increased to an amount which, acting against area 51, is sufficient to further compress the spring 57. Thus, inherently, the bleed valve will not open until the built up pressure is higher than the pressure within the receiver at the instant the inlet valve closed. With the upper spring compressed to any given extent, within its full-operation range, which will cause an opening of the inlet valve and then delay the re-closing of the inlet valve until a given pressure is built up in the receiver, it always requires a pressure greater than said given pressure to open the bleed valve. Thus, as the inlet valve is adjusted to give a higher built-up or "regulated" pressure, the bleed or relief valve is, in effect, automatically readjusted to maintain a given differential between that pressure and the pressure at which the bleed valve will open.

The value of the constant differential between "regulated" pressure and bleed-off pressure is, in the embodiment we are now discussing, established by the ratio between the force of spring 42 and the pressure area 51 on element 49. This is for the reason that, as the valve members are travelling from the positions of Fig. 12 to the positions of Fig. 13, the force of spring 57 is being overpowered by the effect of the built up pressure on area 51 plus the 30 pound force of spring 42; but when the parts reach the positions of Fig. 13, the lower spring becomes ineffective to raise element 49 any further and therefore is ineffective further to compress spring 57—which further compression is necessary in order to open the bleed valve. Therefore, the built up pressure in the receiver and chamber 31 must first be increased sufficiently to compensate for the loss of the effectiveness of the lower spring before there can be any further compression of the upper spring. With the area 51 equalling .4 square inch, it will require (.4) ($x$ pressure) to compensate for the 30 pounds of up-force previously contributed by the lower spring. Thus it will require $$\frac{30+}{.4}$$

or 75+ pounds per square inch of additional pressure within the receiver to open the bleed valve. And this 75+ pounds represents a constant differential between the "regulated" pressure and the bleed-off pressure, no matter what the "regulated" pressure may be. The value of the constant differential may be varied by changing the extent of pressure area 51, or by substituting lower springs of different strengths, or by varying the pre-stressing of a given lower spring. For instance, the ratio between the effective force of the lower spring and the extent of the pressure area 51 may be reduced to such a value that the bleed valve will open when the pressure in the receiver exceeds the regulated pressure by only the fraction of a pound.

I will later describe an embodiment wherein the value of the constant differential is established by the extent to which one of the bleed-valve elements must be moved (after the inlet valve has been closed) before the bleed valve opens, but in all embodiments there is always a primary constant differential between the regulated pressure and the bleed-off pressure, no matter what may be the regulated pressure, and this differential is established by requiring that the upper spring 57 be compressed to a greater extent in order to open the bleed valve than it was compressed at the time the inlet valve was initially closed.

I will now describe the installation illustrated in Figs. 2 through 5. A control or blow out preventer of the type described and claimed in my aforesaid copending application, is conventionally illustrated at 80. It includes a housing 81 defining a bore 82 adapted to take a drill pipe 83. Surrounding pipe 83 is a packer element 84 which comprises an externally conical annulus of rubber or the like, in which are embedded metal inserts 85. This packer is supported against vertical movement between shoulders 86 and 87, and an actuating member 88 in the form of an annular wedge surrounds the packer, said actuating member having piston portions 89 and 90. Piston portions 89 and 90 have piston fit in cylinders 91 and 92, respectively, the piston portion 89 dividing cylinder 91 into upper and lower chambers 93 and 94, respectively.

When the actuating member is in the position of Fig. 2, packer 84 annularly clears pipe 83, but if the actuating member be raised by applying fluid pressure in chamber 94 to piston 89, the conical wedge characteristic of the actuator causes a radial compression of the packer into sealing engagement with pipe 83, thus "packing-off" the pipe to prevent leakage of gas or well-fluid therepast. Once the packer is thus closed about the pipe, the well pressure may be effective against piston portion 90 to further raise the actuator and thus more tightly constrict the packer about the pipe. If this well pressure reaches such a high value that the packer is too tightly constricted about the pipe, the pressure from chamber 94 may be relieved, and fluid pressure may be admitted to chamber 93 to depress the actuator, against the force of the well-pressure, sufficiently to decrease the packer-constriction to the desired extent.

Leading from chamber 94 to a four-way valve 95 (Figs. 2 to 5) is a pipe-line 96, there preferably being a globe valve 97 in said pipe line. Leading from chamber 93 to valve 95 is a pipe line 98. Pipe 33 from regulator valve 12 is also connected to valve 95, while waste pipe 54 extends from valve 12 to a return or exhaust pipe 99 which has a branch 100' extending to valve 95.

When valve 95 is in the condition of Fig. 2 and valve 97 is open, pipes 33 and 96 put secondary chamber 31 of valve 12 into communication with "receiver" chamber 94 of control head 80; while pipe 98 puts chamber 93 into communication with exhaust pipe 99. When valve 95 is in the condition of Fig. 2a, chamber 31 is in communication with "receiver" chamber 93, and chamber 94 is in communication with exhaust pipe 99. In all conditions of valve 95, waste pipe 54 and bleed duct 35 of stem 34 are in communication with exhaust pipe 99.

In "stand-by" condition, regulator valve 12 is in the condition of Fig. 15, that is, hand wheel 65 is adjusted until stem extension 38 is bottomed on housing member 16, and until member 58 engages extension 50 of element 49, inlet valve 41 being thus positively held in a full open condition and bleed valve 46 being positively held in a closed condition.

I will now describe a series of operational steps, but it will be understood the specified sequence of these steps need not be followed in all cases. Furthermore, except for the high desirability that valve 12 be in the condition of Fig. 15 during periods of stand-by condition of the other valves need not be that set forth in the following description. It will be assumed that, during stand-by periods, valve 97 is open and valve 95 is in the condition of Fig. 2. If the pressurized actuating fluid is to be supplied by a pump, the pump will, of course, be shut down. If the pressurized fluid is to be supplied from an accumulator, valve 100 (Figs. 2 and 3) in supply line 11 will be closed.

Now suppose an emergency arises, such as an impending or an initiated "blow-out," calling for an immediate and sure closing of packer 84 about pipe 83. The pump (not shown) supplying pressurized fluid to line 11 is started up, or, if the pressurized fluid is supplied from an accumulator (not shown) valve 100 is opened. Full line pressure, which may be in the order of 1500 pounds per square inch, is thus admitted through pipe 11 to primary chamber 30 whence it passes through the fully open inlet valve 41 (Fig. 15) secondary chamber 31, pipe 33, valve 95 and pipe 96 into chamber 94. The full line pressure acts against piston 89 to raise actuator 87 and thus to tightly constrict packer 84 about pipe 83.

The emergency has now been cared for, but since it usually desirable or necessary to "work" the pipe rotationally and/or longitudinally in order to prevent it from "sticking" in the bore hole, it becomes highly desirable to reduce the constrictive force of the packer, and then to maintain a substantially uniform and relatively reduced pressure within chamber 94, so the relatively reduced constrictive pressure of the packer remains substantially constant. The pressure required within chamber 94 to maintain the desired packer-pressure will vary with different installations and with different well conditions but in each case the value of the pressure is fairly critical for it is usually desirable to have just sufficient pressure to hold the well gas or fluid under full control but yet to allow just enough leakage between the packer and pipe to provide lubrication during "working" of the pipe.

Accordingly, regulator valve 12 is adjusted to provide some predetermined fluid pressure, lower than that of full line-pressure, within chamber 94. This is accomplished by backing-off stem 62, the first few turns resulting in the closing of inlet valve 41. After the inlet valve is just closed, the operator further unscrews stem 62, else bleed valve 46 will not open if, through some cause such as forceful downward displacement of actuator 87, the pressure within chambers 94 and 31 exceeds the full line pressure—though if the pressure in those chambers drops to a certain value the inlet valve will re-open and re-build the chamber pressure up to that certain value. Ordinarily, however, it is desired to provide for a bleed-off of any pressure exceeding the "regulated" pressure and therefore the stem 62 is normally backed off sufficiently to insure that, once the inlet valve is initially closed, it is also possible for the bleed valve to open. In fact, the instant the stem 65 is backed off sufficiently to allow the bleed valve to open, the built up pressure acts against area 51 in a manner to open the bleed valve and thus to reduce the value of the pressure in chambers 94 and 31 to a point below full line-pressure. Then, if the stem 62 be backed off to the position of Fig. 13, for instance, the bleed valve will remain open until the pressure in chambers 94 and 31 drops to a value corresponding to that which would exist had the stem been screwed down from the position of Fig. 6 to the position of Fig. 13.

Under certain circumstances it is desirable to "trap" the pressure in chamber 94 so the actuator may be maintained in applied condition even though the pump is shut down or the accumulator is ineffective to deliver pressurized fluid. In such a case, globe valve 97 is closed, but regulator 12 is then no longer capable of compensating for leakage to or from chamber 94. It is therefore assumed throughout the description that valve 97 is open.

Should pipe 83 be elevated through control head 80 after valve 12 has been "regulated," as above, the tool joint 83' will radially expand packer 84 as it passes through it, causing actuator 88 to be depressed in a manner tending to raise the pressure of and to displace the fluid from within chamber 94. This rise in pressure opens bleed valve 46 and "dumps" the displaced fluid through pipe 54. As soon as the tool joint clears the packer the back pressure drops and the bleed valve closes, whereupon the reduced pressure in chambers 94 and 31 allows spring 57 to open inlet valve 41, whereupon the predetermined "regulated" pressure within chambers 31 and 94 is restored.

Should the well pressure exert such force on piston 90 as to constrict the packer too tightly about pipe 83, regulator 12 is adjusted to lower the "regulated" pressure accordingly. If the well pressure continues to rise to such an extent that the packer is too tight even when the regulator has been adjusted to give minimum "regulated" pressure, valve 95 may be thrown to the position of Fig. 2a, whereupon the "regulated" pressure is applied to the top of piston 89 where it is exposed in chamber 93, the downwardly acting pressure being regulated to have such value that it counter-acts the excessive force applied against piston 90 by the well fluid.

In Figs. 16 through 18, I have shown a variation embodiment of my invention, wherein such elements as are the same as those in Fig. 6 are given the same reference numerals, and such parts as have similar function but are different in detail are given the same reference numerals plus a letter subscript. The description of the embodiment of Figs. 6 through 15 is to be considered as applied to the embodiment of Figs. 16 through 18, (as well as to the embodiment of Figs. 19 through 21) insofar as that application is appropriate.

In the embodiment of Figs. 16 through 18, member 58a is suspended from screw 62 by a swivel connection 110, while spring 57a is hooked at one end 111 into member 58a and is hooked at the other end 112 into the tubular extension 50a of bleed valve element 49a. Element 49a is thus suspended from stem 62 through member 58a and spring 57a. Stem 34a, in turn, is resiliently suspended from element 49a by relatively weak compression spring 113, which is interposed between the stem-flange 114 and the flange 115 on element 49a. Spring 113 has sufficient strength to normally maintain bleed valve 46 in closed condition, but it does not resist the opening of inlet valve 41, as does spring 42. The relative diameter of extension 50a and seat 47a are such that there is provided an effective pressure area 51a, similar in character and function to area 51.

The diameters of seat 29 and stem extension 38a are equal, so, when the inlet valve is closed, valve stopper 39a is "balanced," in contra-distinction to the unbalanced condition of stopper 39 when in the position of Fig. 6, though, if desired, the feature of unbalance may be incorporated in the embodiment of Figs. 16 to 18.

Fig. 16 illustrates the valve under conditions corresponding to those described in connection with Fig. 12, that is, inlet valve 41 has been opened by depressing member 58a through actuation of screw 62.

As soon as the pressure in secondary chamber 31 has been built up to such a value that, acting against area 51a, lifts element 49a against the regulated force of spring 57a, spring 113 will transmit the lift to stem 34a and will close inlet valve 41, the parts then being in the positions of Fig. 17, and the receiver fluid will be at predetermined "regulated" pressure. If the pressure in the receiver drops below the "regulated" value, spring 57a becomes effective to re-open valve 41 and to permit the restoration of receiver pressure to regulated value, whereupon the inlet valve re-closes.

No matter what may be the "regulated" pressure, it will require a receiver pressure of greater than the instant regulated pressure to cause an opening of bleed valve 46, for spring 57a must be compressed to a greater extent than it was in allowing the inlet valve to close and establish that regulated pressure. To this constant differential is added a constant differential represented by the additional force necessary to compress spring 113 sufficiently to open the bleed valve 46 (Fig. 18). The value of this additional constant differential depends upon the ratio between the effective force of spring 113 and the size of pressure area 51a. For instance, if spring 113 exerts a bleed-valve closing force of one pound, and the pressure area 51a equals 1 sq. in., the differential between the regulated pressure and the bleed-off pressure will be $$\frac{1+}{.4}$$

or 2.5 pounds per square inch.

In the embodiment of Figs. 6 through 18, the added differential constant between "regulated" and bleed-off pressures (that is, the constant added to the minimum effective differential represented by the inherent resistance of upper spring 57 to the slightest further compression after the inlet valve 41 has been closed) is established by nullifying the effectiveness of the lower spring 42 as an aid in compressing spring 57 beyond the point at which the inlet valve has been closed, thus requiring an additional, commensurate spring-compressing force before the bleed-valve can open.

On the other hand, in the embodiment of Figs. 16 to 18, the added differential constant is established by adding the resistance of lower spring 113 to the resistance of upper spring 57a in opposing upward movement of element 49a beyond the point at which it allowed the inlet valve to close, thus requiring an additional, commensurate spring-compressing force before the bleed valve can open.

In both embodiments the effect is the same as though the upper springs were additionally loaded to the extent of the effective forces of the respective lower springs the instant there is a tendency to open the bleed valve. Therefore, in both cases, in order to open the bleed valve the pressure directed against face 51 or 51a, as the case may be, must be raised above the "regulated" value to compensate for the difference in effectiveness of the lower springs before and after inlet-valve-closure.

In Figs. 19 to 21 I have illustrated schematically an embodiment of my invention wherein only a single spring is used, and where the value of the constant differential between regulated pressure and bleed-off pressure is established by the extent to which one of the bleed valve members must be moved, after the inlet valve has been closed, before the bleed valve can open. As another distinction, slide valves, as distinguished from poppet valves, are used in connection with both the inlet and bleed-off control. While the principle of operation here set forth applies to a situation where the inlet and relief valve pistons are integral or are direct-connected and are reciprocated together through a single bore, I have illustrated the inlet and bleed valve pistons as reciprocating through individual bores, the pistons being lever-connected for movement, one by the other.

Housing or body member 120 is provided with spaced, parallel bores, the bore 121 being of uniform diameter throughout, while bore 122 has a portion 123 of larger diameter than is portion 124. Passage 28b connects bore 121 with bore portion 123. Inlet valve 41b includes a stopper in the form of piston 125 connected by stem 126 to a pressure-balancing head 127. Valve piston 125 is held against downward displacement from the position of Fig. 19 by housing-stop 128, the top of piston 125 here being shown as clearing port 129 of passage 28b. This port and piston 125 make up inlet valve 41b. The pistons are yieldably held in the position of Fig. 19 by spring 57b applied to the top of head 127, the effective force of the spring being regulated by adjustment of screw 62b through actuation of hand-wheel 65b.

The lower end of bore 121 is fully open to the atmosphere, while the upper end of the bore is vented at 130. Inlet or line pressure is admitted to primary chamber 30b, defined by members 125 and 127, through inlet port 11b.

Piston 131, having sliding fit in cylinder or bore portion 123, is connected by stem 132 to piston head 133, which has piston fit in the relatively reduced-diameter bore portion or cylinder 124. In the condition of Fig. 19, piston 131 is held so it is below port 134 of passageway 28b and so it blanks bleed port 135, the bleed port and piston 131 comprising bleed valve 46b. The means for so holding piston 131 consists of a lever 136, fulcrumed at 137, and extended into lost-motion connection with stems 138 and 139 depending from pistons 125 and 131, respectively. The spring 57b is thus, in effect, applied through piston 127, stem 126, piston 125, stem 138, lever 136 and stem 139 to piston 131 to yieldingly support the latter in the position of Fig. 19. Outlet port 140 opens from secondary chamber 31b, longitudinally defined by heads 131 and 133, and is adapted to be put into communication with a receiver (not shown).

All the piston heads are preferably provided with sealing rings P and, preferably, stem 139 is adjustably connected at 141 with piston 131, to vary the distance between the top of piston 131 and bleed port 135 when in the starting position of Fig. 19. By varying this distance, the value of the constant differential between regulated pressure and bleed-off pressure may be varied, as will appear later.

In connection with Fig. 19, it may be assumed that spring 57b has been stressed by activation of screw 62b to some predetermined extent. Fluid from a pressure source (not shown) is admitted through port 11b to primary chamber 30b and is free to pass through passageway 28b to secondary chamber 31b and thence through outlet 140 to the receiver (not shown). As the pressure in the receiver and chamber 31b is built up, it acts against the relatively large piston 131 in a manner to depress it against the opposing action of spring 57b; piston 125 being elevated to an extent in proportion to the extent of the depression of piston 131. When the built-up pressure in chamber 31b reaches a predetermined value, piston 131 will have caused elevation of piston 125 to such an extent that port 129 is blanked by that piston (Fig. 20). The inlet valve 41b having thus been closed, the fluid within the secondary chamber and the receiver will be at the predetermined "regulated" pressure.

Should the pressure in chamber 31b drop below the predetermined value, spring 57a becomes effective to depress piston 125 sufficiently to reopen inlet valve 41b and admit line pressure until the fluid in the secondary chamber again reaches the "regulated" pressure, whereupon piston 131 will re-close the inlet valve.

If, on the other hand, the fluid pressure in the secondary chamber rises to a value above the "regulated" pressure, piston 131 is still further depressed until finally bleed valve 46b is opened (Fig. 21) whereupon the pressure in the secondary chamber 31b is relieved until there has been sufficient bleeding to reduce the fluid pressure applied against piston 131 to a point at which spring 57b becomes effective to re-close the bleed valve.

As in the other embodiments, it requires a greater compression of spring 57b to open the bleed valve than was required to close the inlet valve, it following that no matter what the instant regulated pressure may be (as established by the instant adjustment of screw 62b) the bleed-off pressure will always be greater than that regulated pressure by a given amount. However, the value of this constant differential may be regulated by adjustment of connection 141, for that adjustment determines the extent to which the bleed valve piston must be compressed (after the inlet valve has been closed) before port 135 is uncovered.

It will be understood that various changes in design, structure and arrangement may be made without departing from the spirit and scope of the appended claims.

I claim:

1. In a regulator valve, a housing having a primary chamber and a secondary chamber connected by a passage, there being a fluid inlet opening to the primary chamber and a fluid outlet opening from the secondary chamber, a valve seat in said passage, a tubular valve stopper movable axially through said passage to and from a position on said seat, a tubular extension on said stopper projecting into the secondary chamber, the bore of the stopper opening to the exterior of the housing as a bleed-duct, a valve member in the secondary chamber and movable axially to and from a position closing off the bore of the stopper from the secondary chamber, a spring applied to said member and tending both to move said member to said position and to move the stopper from said seat, and an effective pressure-taking area on said member adapted to be exposed to the pressure within the secondary chamber in a manner whereby said pressure tends to overpower said spring.

2. In a regulator valve, a housing having a primary chamber and a secondary chamber connected by a passage, there being a fluid inlet opening to the primary chamber and a fluid outlet opening from the secondary chamber, a valve seat in said passage, a tubular valve stopper movable axially through said passage to and from a position on said seat, a tubular extension on said stopper projecting into the secondary chamber, the bore of the stopper opening to the exterior of the housing as a bleed-duct, a valve member in the secondary chamber and movable axially to and from a position closing off the bore of the stopper from the secondary chamber, a spring applied to said member and tending both to move said member to said position and to move the stopper from said seat, and an effective pressure-taking area on said member adapted to be exposed to the pressure within the secondary chamber in a manner whereby said pressure tends to overpower said spring, and a spring of lesser force than the first mentioned spring and applied to said stopper in a manner to oppose the force of said first mentioned spring when the bore of the stopper is closed off.

3. In a regulator valve, a housing having a primary chamber and a secondary chamber connected by a passage, there being a fluid inlet opening to the primary chamber and a fluid outlet opening from the secondary chamber, a valve seat in said passage, a tubular valve stopper movable axially through said passage to and from a position on said seat, a tubular extension on said stopper projecting into the secondary chamber, the bore of the stopper opening to the exterior of the housing as a bleed-duct, a valve member in the secondary chamber and movable axially to and from a position closing off the bore of the stopper from the secondary chamber, a spring applied to said member and tending to move the stopper from said seat, and an effective pressure-taking area on said member adapted to be exposed to the pressure within the secondary chamber in a manner whereby said pressure tends to overpower said spring, and a spring of lesser force than the first mentioned spring and carried by said member, said second spring resiliently resisting relative axial movement of the valve member and stopper.

4. In a regulator valve, a housing having a primary chamber and a secondary chamber connected by a vertical passage, the secondary chamber being above the primary chamber, there being a fluid inlet opening to the primary chamber and a fluid outlet opening from the secondary chamber, an annular valve seat in said passage, a tubular valve stopper below said seat and movable axially through said passage to and from a position of engagement with said seat, an upward tubular extension on said stopper projecting into the secondary chamber, a downward, tubular and open-ended extension on said stopper, said downward extension extending downwardly through and in externally fluid-tight relation to a defining wall of the primary chamber whereby the bores of the extensions and of the valve stopper are in communication with the atmosphere, a valve member in the secondary chamber and movable vertically to and from a position closing off the upper end of the bore of said upward extension from the secondary chamber, a spring applied to said member and tending both to move said member to said position and to move the stopper from its seat, an effective pressure-taking area on said member adapted to be exposed to the pressure within the secondary chamber in a manner whereby said pressure tends to overpower said spring, and a second spring of lesser effective force than the first mentioned spring and applied to said downward extension in a manner to oppose the force of the first mentioned spring when the valve member is in a position closing off the bore of the upward extension.

5. In a regulator valve, a housing having a primary chamber and a secondary chamber connected by a vertical passage, the secondary chamber being above the primary chamber, there being a fluid inlet opening to the primary chamber and a fluid outlet opening from the secondary chamber, an annular valve seat in said passage, a tubular valve stopper below said seat and movable axially through said passage to and from a position of engagement with said seat, an upward tubular extension on said stopper projecting into the secondary chamber, a downward, tubular and open-ended extension on said stopper, said downward extension extending downwardly through and in externally fluid-tight relation to a defining wall of the primary chamber whereby the bores of the extensions and of the valve stopper are in communication with the atmosphere, the outside diameter of the downward extension, where it passes through said wall, being of lesser dimension than the diameter of said seat at its annular line of engagement by the stopper, a valve member in the secondary chamber and movable vertically to and from a position closing off the upper end of the bore of said upward extension from the secondary chamber, a spring applied to said member and tending both to move said member to said position and to move the stopper from its seat, an effective pressure-taking area on said member adapted to be exposed to the pressure within the secondary chamber in a manner whereby said pressure tends to overpower said spring, and a second spring of lesser effective force than the first mentioned spring and applied to said downward extension in a manner to oppose the force of the first mentioned spring when the valve member is in a position closing off the bore of the upward extension.

6. In a regulator valve, a housing having a primary chamber and a secondary chamber connected by a vertical passage, the secondary chamber being above the primary chamber, there being a fluid inlet opening to the primary chamber and a fluid outlet opening from the secondary chamber, an annular valve seat in said passage, a tubular valve stopper below said seat and movable axially through said passage to and from a position of engagement with said seat, an upward tubular extension on said stopper projecting into the secondary chamber, a downward, tubular and open-ended extension on said stopper, said downward extension extending downwardly through and in externally fluid-tight relation to a defining wall of the primary chamber whereby the bores of the extensions and of the valve stopper are in communication with the atmosphere, a valve member in the secondary chamber and movable vertically to and from a position closing off the upper end of the bore of said upward extension from the secondary chamber, an upward extension on said valve member and extending upwardly through and in externally fluid-tight relation to a defining wall of the secondary chamber, the upper end of said member-extension being exposed to atmospheric pressure, the outside diameter of said member extension, where it passes through said defining wall, being of greater diameter than is the diameter of the annular line of engagement between the valve member and the upper end of the upward extension of the stopper, and a spring applied to said valve member and tending both to move said valve member to said position and to move the stopper from its seat.

7. In a regulator valve, a housing having a primary chamber and a secondary chamber connected by a vertical passage, the secondary chamber being above the primary chamber, there being a fluid inlet opening to the primary chamber and a fluid outlet opening from the secondary chamber, an annular valve seat in said passage, a tubular valve stopper below said seat and movable axially through said passage to and from a position of engagement with said seat, an upward tubular extension on said stopper projecting into the secondary chamber, a downward, tubular and open-ended extension on said stopper, said downward extension extending downwardly through and in externally fluid-tight relation to a defining wall of the primary chamber whereby the bores of the extensions and of the valve stopper are in communication with the atmosphere, a tubular valve member in the secondary chamber and movable vertically to and from a position closing off the upper end of the bore of said upward extension from the secondary chamber, the bores of the valve member and the upward extension being in communication, an upward, tubular extension on said valve member and extending upwardly through and in externally fluid-tight relation to a defining wall of the secondary chamber, the bore of the member-extension opening at its upper end to a housing-chamber end and at its lower end to the bore of the member, all whereby the upper end of said member is exposed to atmospheric pressure, the outside diameter of said member extension, where it passes through said defining wall, being of greater diameter than is the diameter of the annular line of engagement between the valve member and the upper end of the upward extension of the stopper, and a spring applied to said valve member and tending both to move said valve member to said position and to move the stopper from its seat.

GRANVILLE S. KNOX.

REFERENCES CITED

The following references are of record in the file of this patent:

UNITED STATES PATENTS

| Number | Name | Date |
|---|---|---|
| 573,462 | Hawley | Dec. 22, 1896 |
| 1,725,539 | Riley | Aug. 20, 1929 |
| 1,903,338 | Horne | Apr. 4, 1933 |
| 2,196,279 | Thomas | Apr. 9, 1940 |